United States Patent [19]
Charton

[11] Patent Number: 5,893,494
[45] Date of Patent: Apr. 13, 1999

[54] DEVICE FOR STORAGE OF A SPARE TIRE BENEATH A FLOOR OF AN AUTOMOTIVE VEHICLE AND INCORPORATING MEANS FOR COUPLING A JACK-STORAGE HOUSING

[75] Inventor: René Charton, Elancourt-Village, France

[73] Assignees: Automobiles Peugeot, Paris; Automobiles Citroën, Neuilly Sur Seine, both of France

[21] Appl. No.: 08/742,679

[22] Filed: Oct. 31, 1996

[30] Foreign Application Priority Data

Oct. 31, 1995 [FR] France .................... 95/12872

[51] Int. Cl.$^6$ .................... B62D 43/00
[52] U.S. Cl. .................... 224/42.23; 224/42.12; 224/42.13; 224/42.21; 224/42.24; 224/42.25; 224/42.26; 296/37.2; 414/463; 414/466
[58] Field of Search .................... 224/42.12, 42.13, 224/42.21, 42.23–42.26; 296/37.2; 414/463, 465, 466

[56] References Cited

U.S. PATENT DOCUMENTS

| | | | |
|---|---|---|---|
| 3,554,415 | 1/1971 | Woods | 224/510 |
| 4,093,088 | 6/1978 | Hildebrandt et al. | 224/42.23 |
| 4,228,936 | 10/1980 | Rife | 224/42.23 |
| 4,301,954 | 11/1981 | Brigg | 414/466 |
| 4,676,415 | 6/1987 | Kennedy | 414/466 |
| 5,429,285 | 7/1995 | Kim | 224/42.12 |

*Primary Examiner*—David J. Walczak
*Assistant Examiner*—Timothy L. Maust
*Attorney, Agent, or Firm*—Pollock, Vande Sande & Amernick

[57] ABSTRACT

A spare tire-storage device incorporating a movable support basket capable of housing the tire, this basket being coupled to a housing used to store an object. The coupling arrangement (12) is configured in such a way as to permit positioning of the housing (6) in a space located between the support basket (1) and a car body component (17), so that the housing (6) cannot be removed when the support basket (1) is in the locked position.

10 Claims, 3 Drawing Sheets

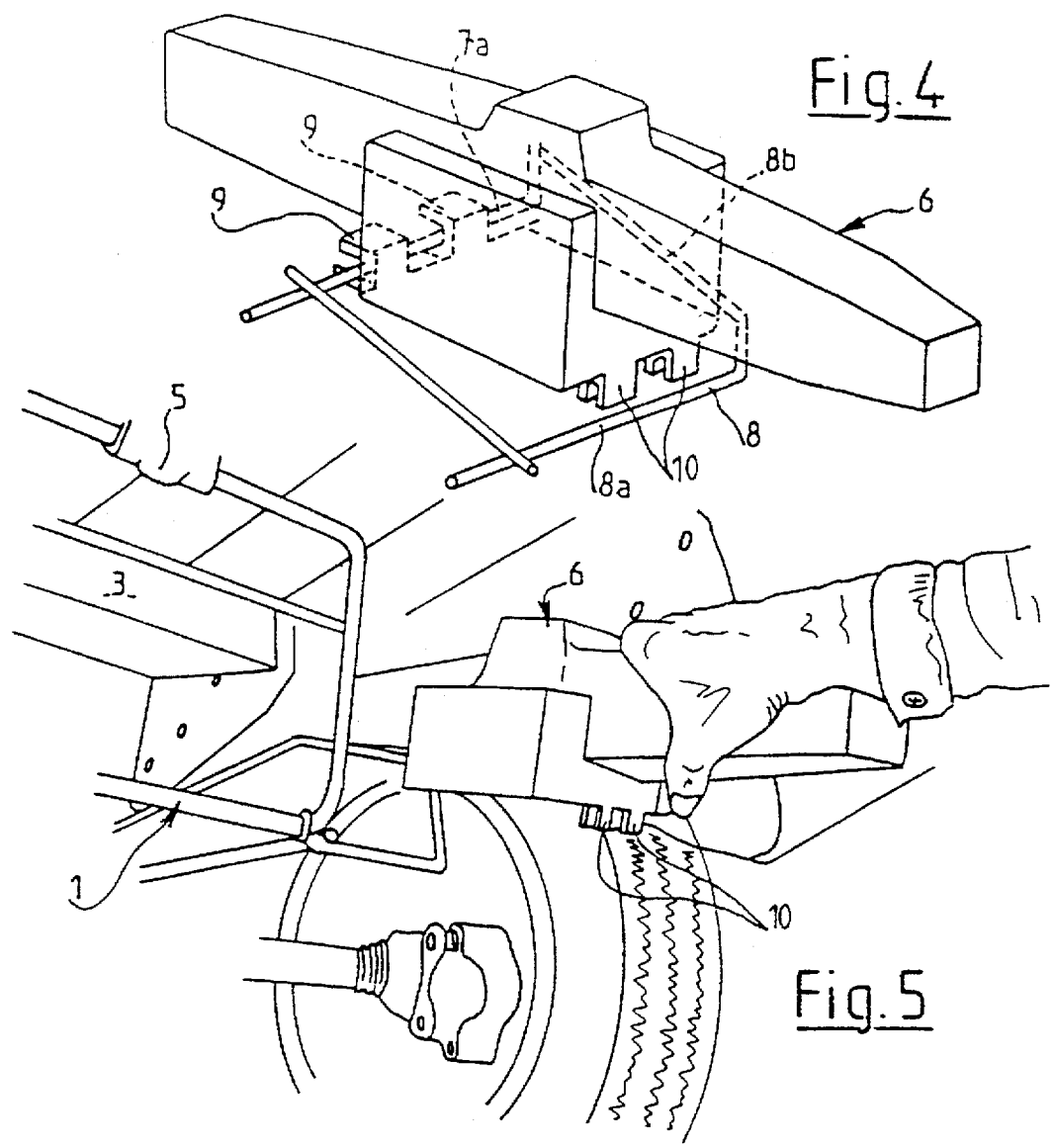
Fig. 4
Fig. 5
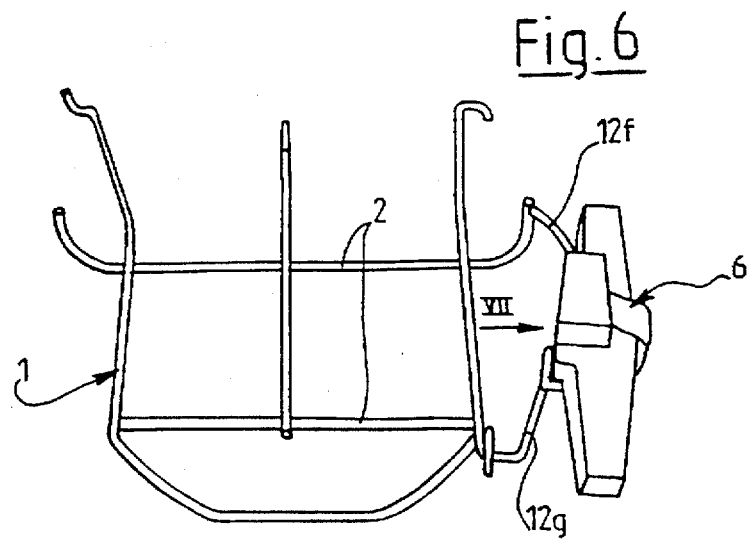
Fig. 6

DEVICE FOR STORAGE OF A SPARE TIRE BENEATH A FLOOR OF AN AUTOMOTIVE VEHICLE AND INCORPORATING MEANS FOR COUPLING A JACK-STORAGE HOUSING

FIELD OF THE INVENTION

The present invention concerns a device for storing a spare tire beneath a floor of an automotive vehicle.

BACKGROUND OF THE INVENTION

FIGS. 1 to 5 illustrate a storage device of this type according to the prior art. It comprises a movable wire support basket 2 and capable of holding the spare tire (not shown). The support basket 1 is connected to the structure 3 of the vehicle on one side by jointing means 4 (of which only a single element is illustrated in FIG. 2) articulated around a substantially horizontal axis, and, on the opposite side, by conventional releasable locking means 5. The support basket 1 is fitted with means for coupling to a housing 6 used to store an object such as a jack. These coupling means include two wires 7, 8 made integral with the support basket 1 and comprising two parallel sections 7a, 8a, to which the storage housing 6 is detachably fastened. To this end, the lower portion of housing 6 comprises, two pairs of elastic clamps 9, 10, in which the two wire sections 7a, 8a are housed by clamping, as shown in FIGS. 2 and 3. The two wire sections 7a, 8a are joined by a wire section 8b perpendicular to the sections 7a, 8a and forming part of the wire 8. The section 8b lies in a plane substantially perpendicular to the two wire sections 7a, 8a, while being positioned above the latter so as to hold the storage housing 6 in place laterally. The section 8b is made integral at its free end, for example by welding, with a wire section 7b of the wire 7, which is bent substantially at a right angle. The bent section 7b connects the coupling portion 7a of the wire 7 to an upper portion 7c of the wire 7 disposed within the same plane as the coupling section 7a. The upper portion 7c extends above the storage housing 6 and branches off to connect to the support basket 1.

This conventional device has the disadvantage of being easily breachable in the locked position of the support basket 1.

In fact, as shown in FIGS. 2 and 5, to uncouple the storage housing 6 from the coupling wires 7a, 8a, one need only generate upward thrust in the direction of the arrow F1 on the storage housing 6, whose rear end portion is located at a distance from the floor allowing the storage housing 6 to be swivelled around the coupling wire 7a. This thrust releases the two substantially vertical elastic clamps 10 from the coupling wire 8a. Then as shown in FIG. 5, it is sufficient only to pull the storage housing backward to release the two other substantially horizontal elastic clamps 9 from the coupling wire 7a.

In other words, any ill-intentioned person can easily detach and abscond with the storage housing 6 and its contents.

SUMMARY OF THE INVENTION

The present invention is intended to overcome the aforementioned disadvantage of prior art devices, by proposing a device for storage of a spare tire beneath a floor of an automotive vehicle, this device comprising a movable support basket capable of holding the wheel and connected to the structure of the vehicle on one side by jointing means articulated around a substantially horizontal axis, and on another side by locking means, the support basket being equipped with means for coupling to a housing used to hold an object such as a jack. The coupling means are configured so as to make it possible to position the housing in a space located between the support basket and a stationary component of the automobile body, so that the housing cannot be removed when the support basket is in locked position.

The coupling means are arranged in such a way that the housing can be removed only by a lateral rotational movement, followed by a longitudinal translational movement in the released position of the support basket.

The support basket is made of wire, e.g., steel wire, and the means employed to couple the housing are also made of wire, preferably wire comparable to that of which the support basket is made.

The jack-storage housing comprises a protuberance fitted with two groups of supports, each of which is composed of two elements delimiting an opening in which the coupling wire may be inserted, the respective openings being located in perpendicular planes.

Preferably, each element of a group of supports is in the form of an elastic clamp, in which the coupling wire may be clamped in place.

The elements of the groups of supports are positioned in such a way that the two portions of the coupling wire supported by each of the groups are parallel to each other.

The two aforementioned portions of the coupling wire are connected by another, U-shaped section of the coupling wire which encloses the protuberance of the jack housing and lies in a plane perpendicular to the two portions of coupling wire.

Preferably, the housing-coupling means are made from a single wire.

The coupling wire comprises a section which extends above the upper element of each of the groups of supports.

BRIEF DESCRIPTION OF THE DRAWINGS

The invention will be better understood upon reading the following explanatory description provided with reference to the attached drawings illustrating an embodiment of the invention, and in which:

FIG. 4 is a perspective view similar to FIG. 3, representing with greater clarity the release phase of the storage housing in the locked position of the support basket;

FIG. 5 is a perspective view similar to FIG. 2, showing the complete disengagement of the storage housing from its support basket, in the locked position;

FIG. 6 is a view similar to FIG. 1, illustrating the coupling of the storage housing to the support basket in accordance with the invention;

DESCRIPTION OF PREFERRED EMBODIMENT

Figure 1:
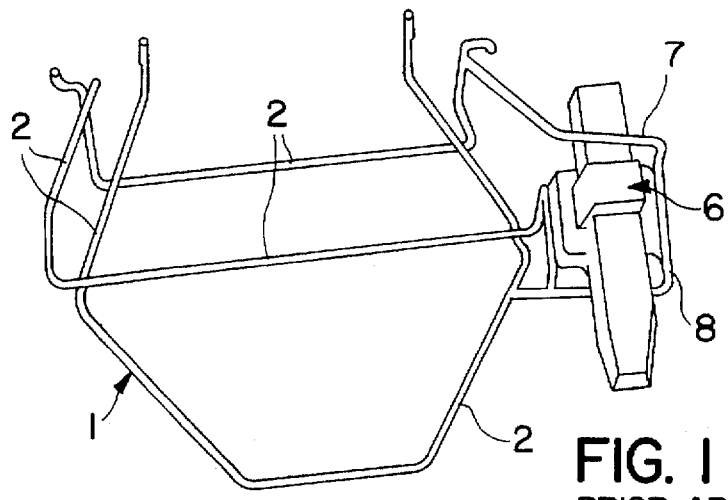
FIG. 1 represents, a support basket for a spare tire of an automotive vehicle, to which a prior art storage housing is coupled.
Figure 2:
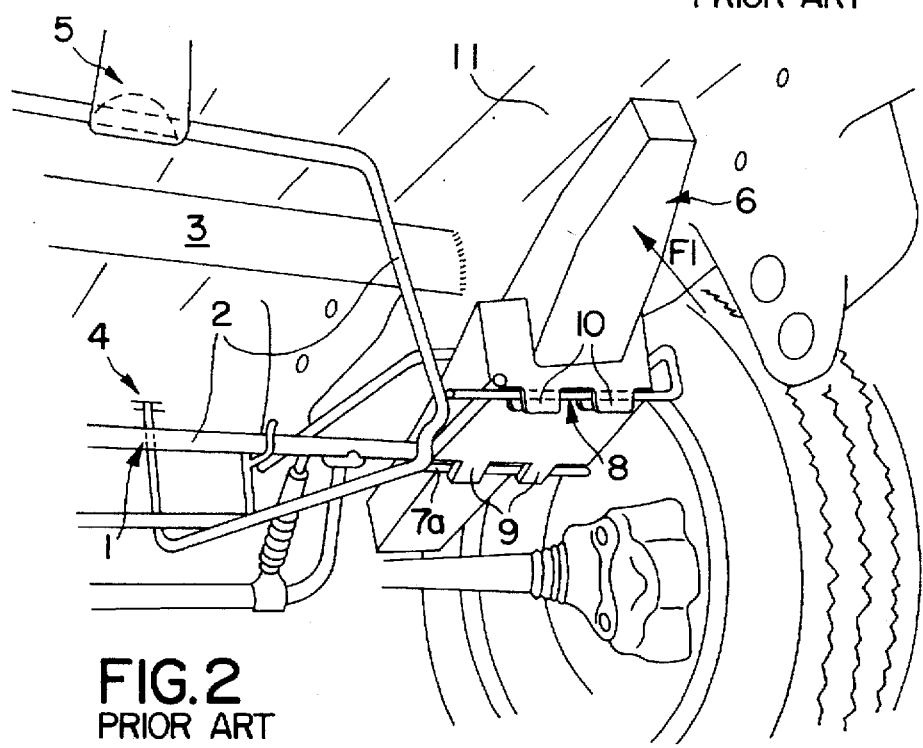
FIG. 2 is a perspective view from below of a rear portion of an automotive vehicle, representing the support basket and the associated storage housing in the locked position.
Figure 3:
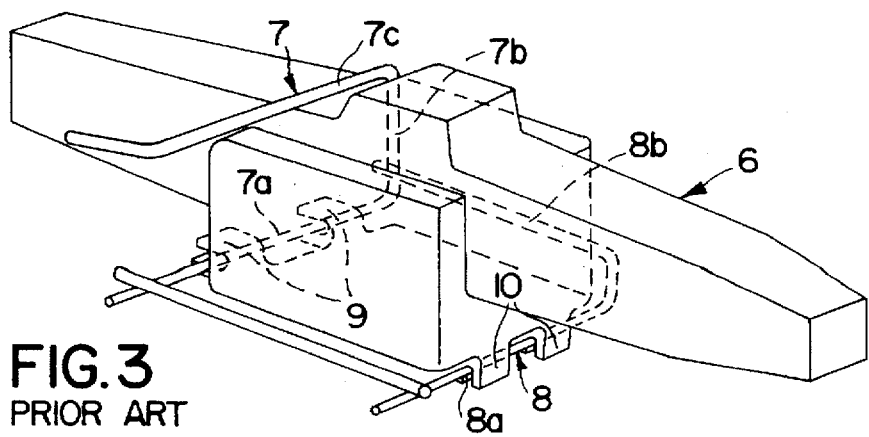
FIG. 3 is a perspective view showing a prior art arrangement for coupling a storage housing to the support housing.
Figure 7:
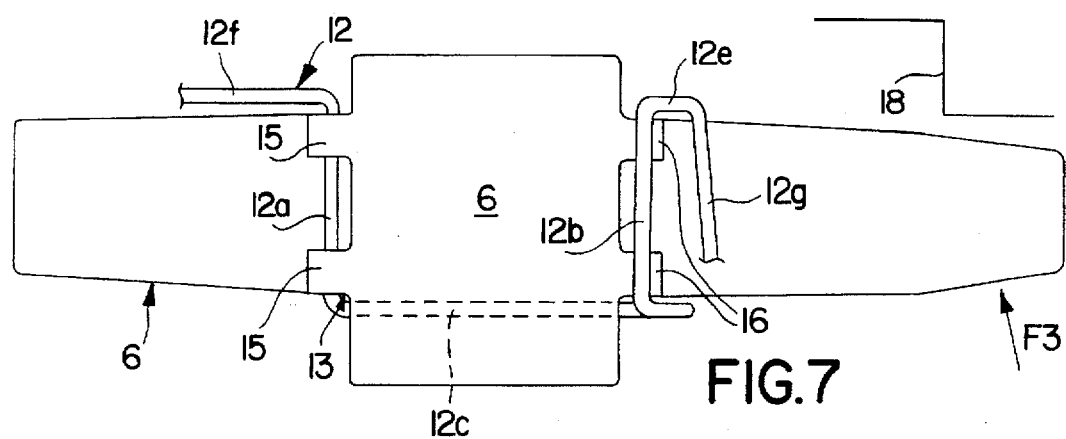
FIG. 7 is a view of the storage housing in the direction of arrow VII in FIG. 6.

The components which are common to the prior art storage device shown in FIGS. 1 to 5 and by the storage device according to the invention illustrated in FIGS. 6 to 9 bear the same reference numbers and will not again be described in detail.

In the storage device illustrated in FIGS. 6 to 9, the means used to attach the storage housing 6 are arranged so as to allow positioning of the housing 6 in a space located between the support basket 1 and a fixed component of the car body, to be specified below, in such a way that the housing 6 cannot be removed when the support basket 1 is in locked position.

To this end, the means used to attach the housing 6 are made of a wire 12, preferably a single wire, such as a steel wire which is comparable to that composing the support basket 1.

The storage housing 6 comprises a protuberance 6a fitted with two groups of supports 13 and 14, the group 13 comprising two front elements 15 delimiting an opening in which a portion 12a of the coupling wire 12 can be inserted, while the other group 14 comprises two rear elements 16 delimiting an opening in which a portion 12b of the coupling wire 12 can be inserted. The openings formed by the two pairs of elements 15, 16 lie respectively in perpendicular planes, the two front support elements 15 extending substantially in a direction parallel to the longitudinal axis of the vehicle.

Preferably, the support elements 15, 16 are elastic clamps, in which the portions 12a and 12b of the wire 12 can be clamped in position. The pairs of elements 15, 16 are positioned in such a way that the two portions 12a, 12b of the coupling wire 12 inserted in these elements are parallel to each other and connected by another, U-shaped portion 12c of the wire 12 enclosing the protuberance 6a of the storage housing, the U-shaped portion 12c extending in a plane perpendicular to the two portions 12a, 12b of the coupling wire 12. The coupling wire 12 further comprises two sections 12d, 12e extending above the two upper elements 15, 16, respectively, of each of the groups of supports, and these sections 12d, 12e of the wire 12 are extended by two arms 12f, 12g rendered integral with the support basket 1.

When the support basket 1 is unlocked from the vehicle structure in order to allow access to the spare tire, the storage housing 6 can be removed from the basket 1 by exerting lateral thrust on the rear end of the housing 6 in the direction indicated by the transverse arrow F1, in order to uncouple the two support elements 16 from the portion 12b of the coupling wire 12. This operation entails a lateral rotational movement of the housing 6 around the portion 12a of the coupling wire 12. It then suffices merely to exert on the housing 6 a longitudinal tractive force in the direction indicated by the arrow F2 in order to uncouple the two support elements 15 from the portion 12a of the coupling wire 12 and, accordingly, to release the storage housing 6 in order to obtain access to the jack.

Figure 8:
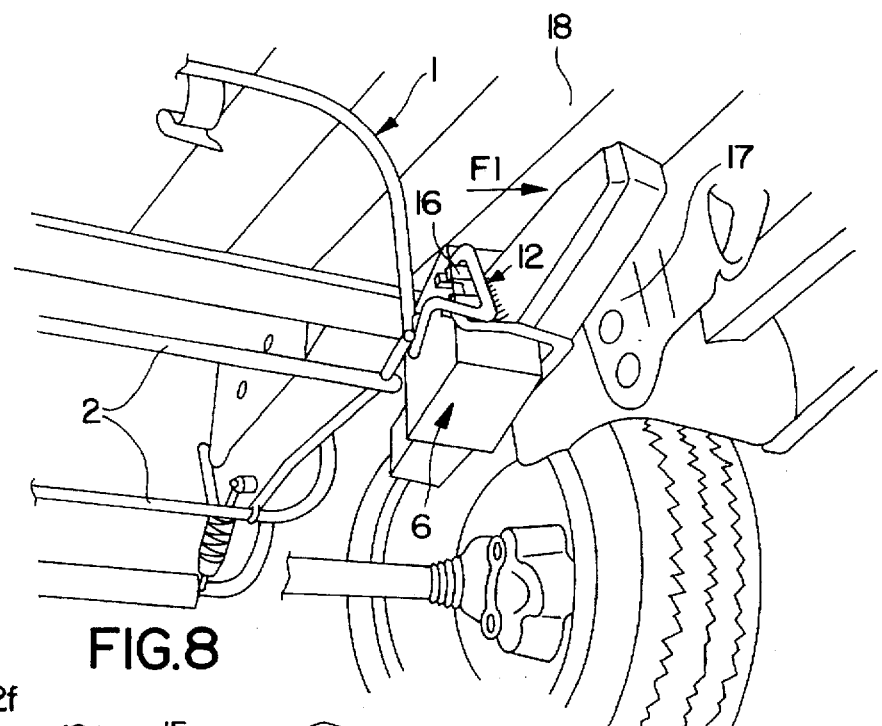
FIG. 8 is a perspective view similar to FIG. 2, showing the support basket according to the invention and the storage housing in the locked position.
Figure 9:
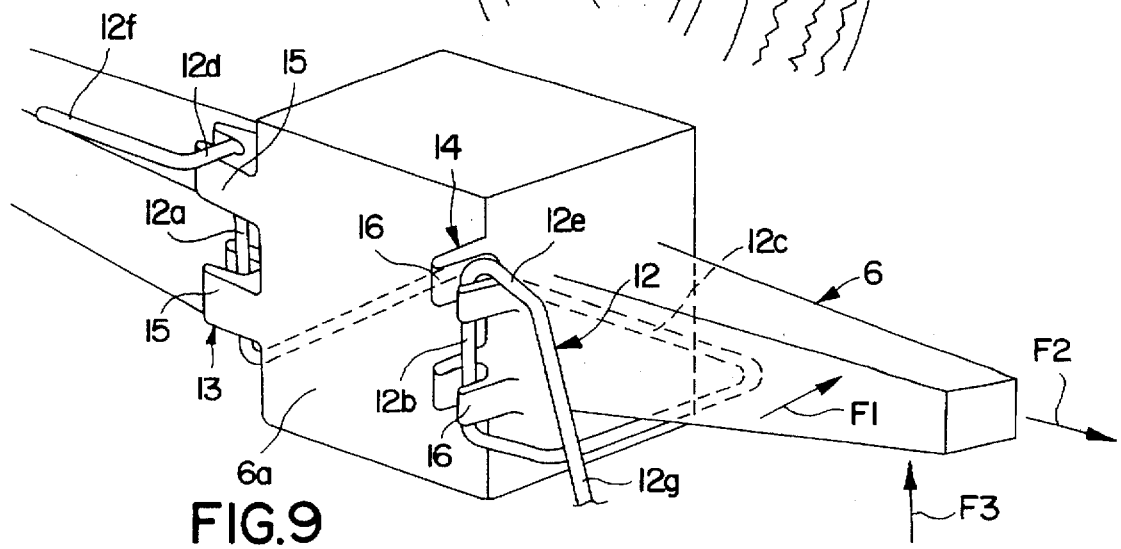
FIG. 9 is a perspective view illustrating with greater clarity how the storage housing is coupled to the support basket.

When the support basket 1 is locked to the vehicle frame, it is impossible to effect the lateral movement of the housing 6 in direction of the arrow F1, since, as shown in FIG. 8, the housing 6 hits against the car body component, which, in the present instance, is the support 17 of the towing ring (not shown). In this locked position of the support basket 1, it is also impossible to uncouple the housing 6 by exerting thrust in the direction of the arrow F3, because the rear end portion of the housing 6 hits against another car body component, in this instance the rear crossbeam 18 (see FIGS. 7 and 8). Finally, all attempts to remove the housing 6 by pulling it toward the rear of the vehicle will unavoidably fail, since the two rear elements 14 of the housing 6 hit the stationary portion 12b of the coupling wire 12.

I claim:

1. A device for storage of a spare tire beneath a floor of an automotive vehicle, comprising a movable support basket (1) capable of storing the tire and adapted to be connected to a structure of said vehicle on a first side by jointing means (4) articulated around a substantially horizontal axis and, on a second side, by locking means (5), the support basket (1) being fitted with means (12) for coupling to a housing (6) for storage of equipment, wherein the coupling means (12) are so configured as to allow positioning of said housing (6) in a space located between said support basket (1) and a stationary vehicle body component (17, 18), whereby said housing (6) cannot be removed when said support basket (1) is in locked position, and wherein said coupling means are so configured that said storage housing can be removed only by a lateral rotational movement, followed by a longitudinal translational movement in the unlocked position of said support basket.

2. The device according to claim 1, wherein said support basket (1) is made of metal wire.

3. The device according to claim 2, wherein said coupling means (1) are made of wire similar to the wire (2) used to make said support basket (1).

4. The device according to claim 3, wherein said housing (6) comprises a protuberance (6a) fitted with two groups of supports (13, 14), each of said groups of supports incorporating two elements (15, 16) delimiting an opening adapted to receive said wire (12), the openings formed by said two groups (13, 14) being located in two perpendicular planes.

5. The device according to claim 4, wherein each element (15, 16) belonging to a group of supports (13, 14) is in the form of an elastic clamp adapted to clamp said coupling wire (12) in place.

6. The device according to claim 4, wherein the elements (15, 16) belonging to the groups of supports (13, 14) are positioned so that two portions (12a, 12b) of said wire (12) supported by each of said groups of supports are parallel to each other.

7. The device according to claim 6, wherein the two aforementioned portions (12a, 12b) of said wire (12) are connected by another, U-shaped portion of said wire (12c) which encloses the protuberance (6a) of said housing (6) and which lies in a plane perpendicular to said two portions (12a, 12b) of said wire (12).

8. The device according to claim 3, wherein said coupling means (12) are produced from a single wire.

9. The device according to claim 4, wherein said wire (12) comprises a section (12d, 12e) extending above an upper element (15, 16) of each of said groups of supports (13, 14).

10. An automotive vehicle equipped with a device for storage of a spare tire beneath a floor of said vehicle, said device comprising a movable support basket (1) capable of storing said tire and being connected to a structure of said vehicle on a first side by jointing means (4) articulated around a substantially horizontal axis and, on a second side, by locking means (5), the support basket (1) being fitted with means (12) for coupling to a housing (6) for storing equipment, wherein the coupling means (12) are so configured as to allow positioning of said housing (6) in a space located between said support basket (1) and a stationary vehicle body component (17), (18), whereby said housing (6) cannot be removed when said support basket (1) is in locked position, and wherein said coupling means are so configured that said storage housing can be removed only by a lateral rotational movement, followed by a longitudinal translational movement in the unlocked position of said support basket.

* * * * *